(12) United States Patent  
Sonnard et al.

(10) Patent No.: US 7,418,683 B1
(45) Date of Patent: Aug. 26, 2008

(54) CONSTRAINT ASSISTANT FOR CIRCUIT DESIGN

(75) Inventors: Jean-Daniel Sonnard, Lausanne (CH); Zhigang Wang, Allison Park, PA (US); Hemanth Sampath, Chandler, AZ (US)

(73) Assignee: Cadence Design Systems, Inc, San Jose, CA (US)

( * ) Notice: Subject to any disclaimer, the term of this patent is extended or adjusted under 35 U.S.C. 154(b) by 200 days.

(21) Appl. No.: 11/233,809

(22) Filed: Sep. 21, 2005

(51) Int. Cl.
    *G06F 17/50* (2006.01)
(52) U.S. Cl. .................................. 716/5; 716/1; 716/18
(58) Field of Classification Search ...................... 716/5, 716/18, 1; 715/18
    See application file for complete search history.

(56) References Cited

U.S. PATENT DOCUMENTS

| 5,604,702 | A | * | 2/1997 | Tailliet | 365/200 |
| 6,058,252 | A | * | 5/2000 | Noll et al. | 716/10 |
| 2003/0016075 | A1 | * | 1/2003 | Itoh | 327/534 |
| 2004/0153982 | A1 | * | 8/2004 | Zhang et al. | 716/4 |

* cited by examiner

*Primary Examiner*—Sun J Lin
(74) *Attorney, Agent, or Firm*—Wheelock Chan LLP; Thomas Chan

(57) ABSTRACT

A computer aided design tool and method for designing IC layouts by recommending subcircuit layout constraints based upon an automated identification from a circuit schematic of subcircuit types requiring special IC layout constraints. Subcircuit types are identified on the basis of netlist examination, as well as cues from the layout of the circuit schematic.

21 Claims, 15 Drawing Sheets

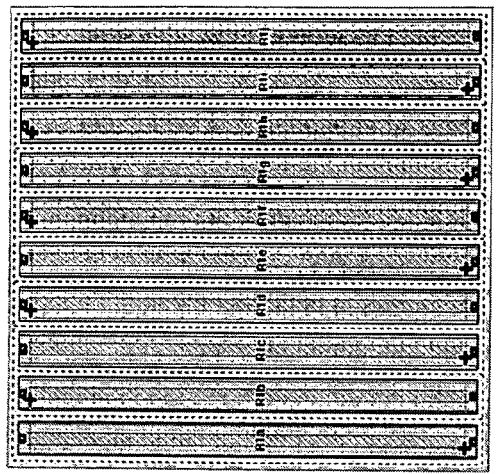
*Fig. 9c*
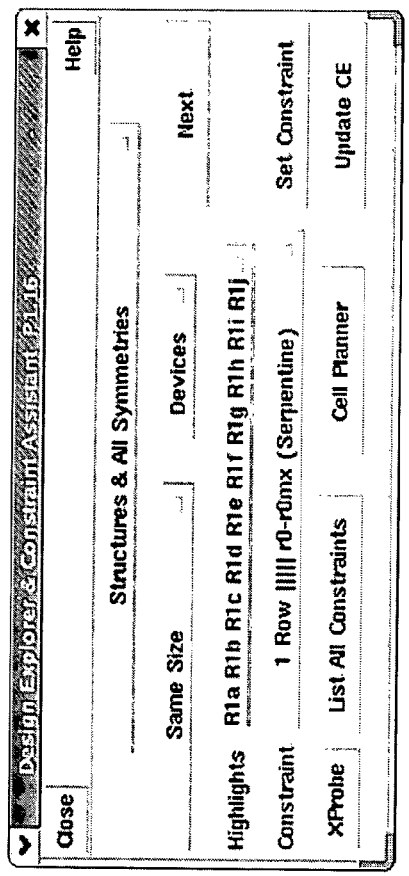
*Fig. 9b*
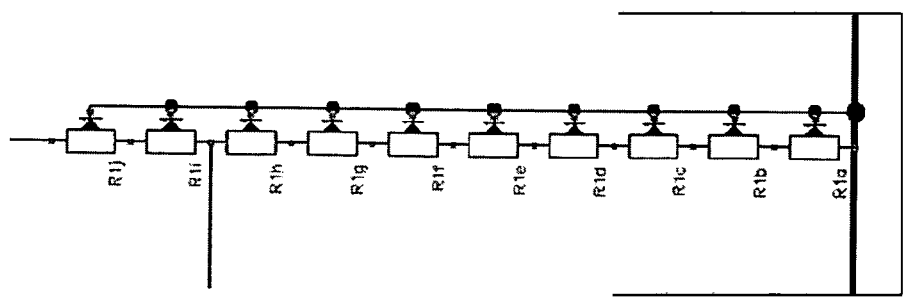
*Fig. 9a*
*Fig. 9*

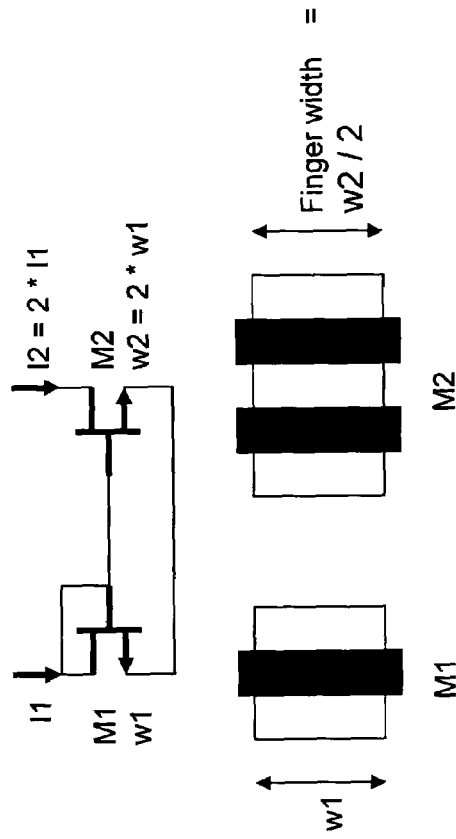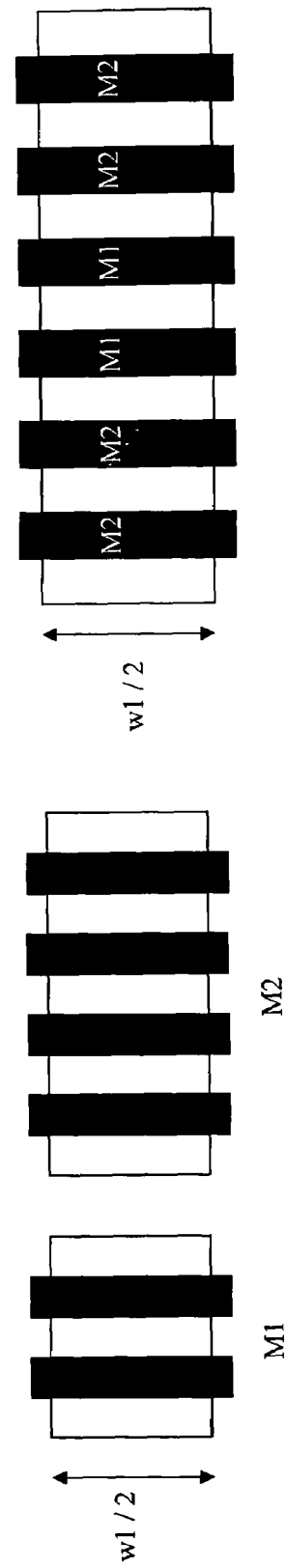
Fig. 13a
Fig. 13b
Fig. 13c

CONSTRAINT ASSISTANT FOR CIRCUIT DESIGN

BACKGROUND OF THE INVENTION

1. Field of the Invention

The present invention relates to computer-aided design and design analysis tools for electronic integrated circuits, specifically computer aided design tools and methods for providing a circuit designer with improved means for designing physical circuit layouts.

2. Description of the Related Art

Electronic circuits form the building blocks of electronic devices. Electronic integrated circuits ("ICs") based on silicon, or other semiconductor, technologies have revolutionized many aspects of everyday life because of high functionality, compact size, low power consumption, and low cost. Whereas conventional electronic circuits usually embody from a few to hundreds of electronic components, including ICs, a single IC can embody from a few to many millions of electronic components such as transistors, diodes, resistors, capacitors, and many others, along with associated interconnections. The various components for an IC are fabricated on a single semiconductor wafer ("wafer") with a typical diameter of two to twelve inches or more, prior to separation into individual ICs. Photolithographic techniques can be used to selectively apply processing steps to the wafer such as: selective epitaxial growth; dopant diffusion; ion-implantation; etching or milling; deposition of various materials, including insulating materials and conductive materials for contacts and interconnection; and others. Ordinarily, several sequential processing steps are necessary to fabricate an IC. Many of these steps use the patterning of a photoresist layer that is temporarily applied to the surface of a wafer. This patterning is typically accomplished by projecting light of various wavelengths, or x-rays, through a photo mask with a desired transparent and opaque pattern that is unique to a particular IC design and process step. Another method for patterning photoresist on a wafer is the direct writing of the pattern using a modulated electron, or other particle, beam. In such cases, files of computer instructions for generating the patterns substitute for actual photo masks.

Together, the set of all masks used to fabricate a particular circuit is referred to as a "mask set." For ICs, depending on the IC fabrication process, mask sets may contain from one to over twenty masks. Sometimes, particularly in the past for smaller diameter wafers, wafers with a photosensitive coating ("photoresist") were exposed to light shown through masks in direct contact with the wafers. This is called "contact lithography." More commonly now, projection steppers step across a wafer using a mask referred to as a "reticule" to expose a repeated image ("field"). This is called "stepper lithography" or "projection lithography." Because of projection, the image projected on the photoresist may be reduced in size from the physical image on the reticule, typically by a factor up to about 10. This allows for defining smaller features on an IC. Also, exposing a large surface area wafer sequentially in repeated fields reduces focus and alignment problems associated with the wafer's surface not being perfectly planar. Reticules typically contain a pattern for one processing step for an IC or multiple ICs, along with various process monitor test structures and alignment features.

Similarly, contact lithography is often used to pattern masks for fabricating interconnection, via holes, and other features for printed circuit boards ("PCB's—sometimes also referred to as printed wiring boards, "PWB"s). A mask set for a PCB typically comprises fewer photo masks that a mask set for an IC.

As circuit complexity and performance requirements increase, the need for matching the electrical characteristics of components to one another in a given circuit, particularly an IC, tends to become stricter. Good electrical characteristic matching is often important to achieve acceptable IC fabrication yield, or even adequate electrical performance at all. The capabilities of a given IC fabrication process to maintain tolerances for electrical characteristics of components are limited. This limitation results because all IC components are fabricated and interconnected simultaneously. No practical capability exists for measuring each device on an individual basis and then accepting or rejecting that device for use in a particular circuit, as is the case for circuits assembled of discrete components and PCBs. Fortunately the electrical characteristics of similar components at different positions within a given IC tend to match one another more often than randomly selected discrete components for assembly with a PCB. But this matching of IC components is not perfect. Spatially non-uniform processing conditions during wafer fabrication often result in component characteristic variations within a given IC. Sometimes the variations in component electrical characteristics appear randomly over the surface of a wafer. At other times, the variations may appear as gradients across the wafer surface, on a larger or smaller area scale. Variations in component electrical characteristics may also occur during circuit operation due to thermal and electrical environment variations arising from the operation of other components and interconnections within the circuit.

BRIEF SUMMARY OF THE INVENTION

The present invention is directed to computer-aided design ("CAD") tools for providing a circuit designer with an efficient means for optimizing circuit design and designing physical circuit layouts based upon the automatic or semi-automatic identification of subcircuit networks from a circuit schematic that have associated physical layout and circuit optimization constraints. Subcircuit types can be identified on the basis of netlist examination, as well as from a designer's cues in the layout of the circuit schematic. In one embodiment, this subcircuit-type identification capability can also be used to modify circuit schematics that are automatically generated from data files from any source so that they are more readable, i.e. have more textbook-like schematic layouts.

A library of subcircuit types and associated physical layout and circuit optimization constraints is maintained, that can be augmented to accommodate different semiconductor fabrication processes and different designer or design project layout preferences.

Additionally, the present invention can be implemented in another embodiment to provide an improved user interface for displaying such subcircuit networks with simultaneous highlighting of corresponding circuit components and connections in corresponding circuit schematic and layout displays. This assists a designer in deciding whether or not a recognized subcircuit is appropriate for the application of recommended layout constraints. This is also useful for checking circuit schematics for connectivity errors. The user interface can be designed to provide expert physical circuit layout assistance to a designer in a conveniently formatted display showing the type of subcircuit detected and recommended layout constraints for consideration and selection. A less experienced designer may learn the "art" of physical circuit layout from this feature, and is far less likely to make costly mistakes that a more experience designer might avoid. An expert circuit designer avoids the time-consuming and error-prone manual selection of schematic elements and application of layout constraints for use during the generation of corresponding physical layouts. The circuit designer can also check his work for accuracy and completeness.

In an embodiment of the invention, subcircuits are determined through the correlation of potential subcircuit netlists with netlist types corresponding to known subcircuit types in a subcircuit-type library. In a further embodiment of the invention, subcircuit determination is enhanced through the examination of the positional placements and orientations of symbols representing subcircuit components in a circuit schematic drawing, i.e. "schematic format examination" ("SFE"). SFE makes use of circuit schematic drawing symmetry, and other drawing conventions for schematic depictions of subcircuits, to speed the selection of subcircuit netlists for correlation with netlist types by identifying likely subcircuit components. The schematic drawing conventions that are used to identify likely subcircuit components are mostly familiar to circuit designers from textbook, engineering class, and workplace exposure. Knowledge of recognized format conventions also allows a circuit designer to encourage or discourage the automatic identification of a potential subcircuit by adjusting the schematic drawing format, without changing circuit connectivity. The various embodiments of the present invention are referred to herein as a layout constraint assistant tool.

BRIEF DESCRIPTION OF THE DRAWINGS

FIG. 9 illustrates an implementation of a GUI of an layout constraint assistant tool showing a subcircuit schematic drawing for a serpentine resistor made of MOSFETs (FIG. 11a), a GUI dialog box describing physical circuit layout constraints (FIG. 11b), and a drawing of a corresponding physical subcircuit layout (FIG. 11c).

FIG. 13 illustrates examples of components with logical constraints.

Figure 1A:
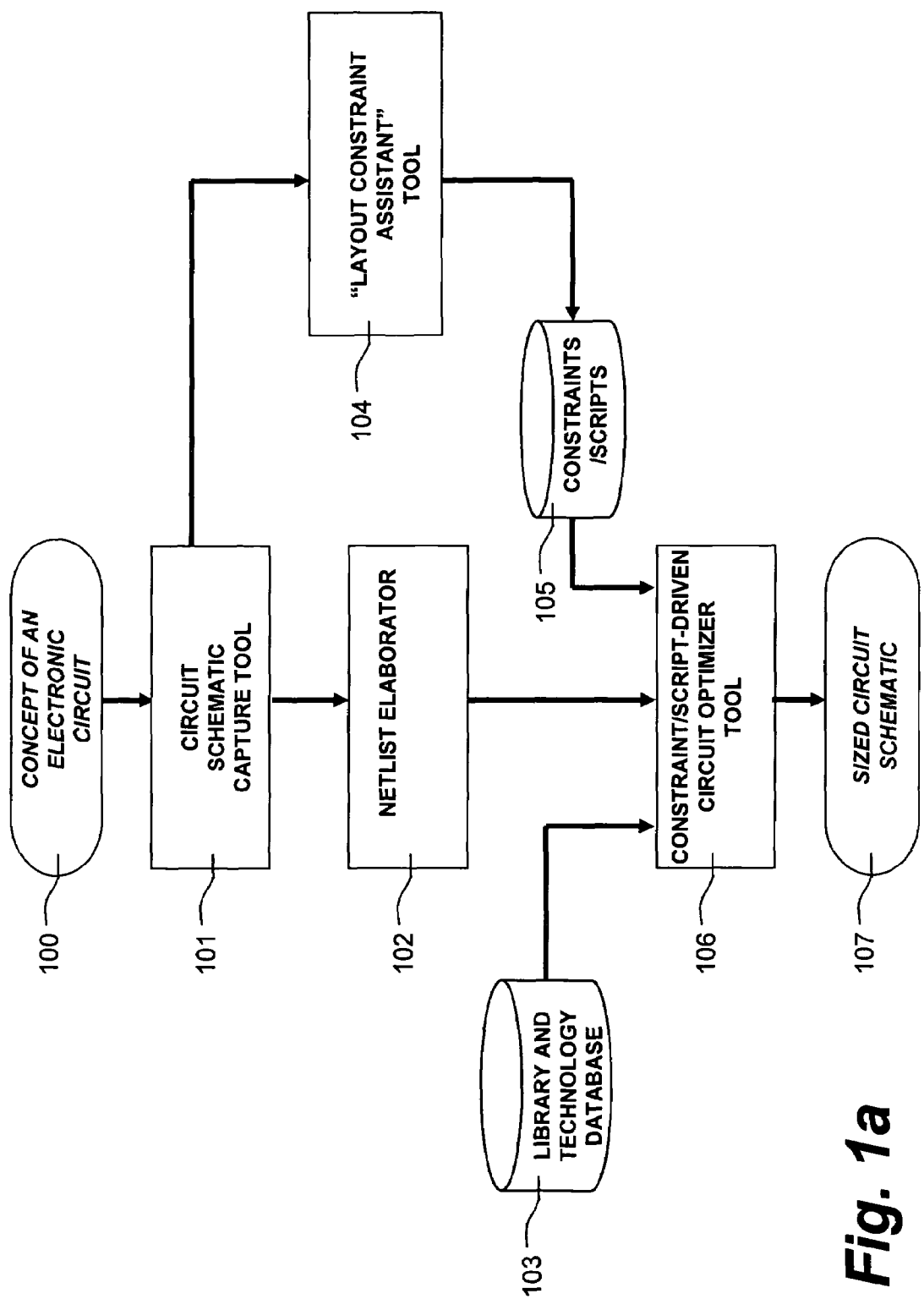
FIGS. 1a, 1b and 1c are high level block diagrams of embodiment examples of a layout constraint assistant tool in different operating environments.

The drawings are provided for purposes of illustration only and not for purposes of limitation. It should be noted that for clarity and ease of illustration these drawings are not necessarily drawn to scale.

DETAILED DESCRIPTION OF THE INVENTION

The present invention is directed toward a system and method of creating physical circuit layouts and parameter relationship constraints for different components in a subcircuit for circuit optimization using circuit simulations. According to one aspect of the invention, layout constraints for physical circuit layouts or parameter relationship constraints are assigned on the basis of subcircuit type as automatically determined by the examination of a circuit schematic, as well as other information.

Parameter relationship constraints will also be referred to herein as "logical constraints." When a designer wants to size his circuit, he needs to care about logical constraints. For example, a current mirror is made of at least two transistors. In case of a current mirror made of MOSFETs, all transistors must have the same gate length for matching reasons.

Therefore, gate length matching is a logical constraint. For the same current mirror, the current ratio is roughly given by the ratio of gate widths of the respective MOSFET transistors. However, to guarantee good matching, the physical implementation of a current mirror is done by splitting the gate of the larger transistor into multiple gates, called fingers. The result is a common finger width for all transistor physical layouts in the same current mirror. This is another logical constraint. FIG. 13a illustrates, using a current mirror circuit example, logical constraints and corresponding physical device layouts. Circuit schematic representation is on the top and layout devices are roughly drawn with an outlined diffusion and a solid black poly gate, but without contacts. If the width over length ratio of the smaller transistor is large enough, the small transistor can be split too and the larger transistor will split again as much, as shown in FIG. 13b. Finally the physical layouts of all transistors of the same current mirror can be interdigitated to further improve matching. This means the gate fingers of M2 will surround the gate fingers of M1, as shown in FIG. 13c.

This example shows that sizing or optimization of the transistor lengths and widths of a current mirror is submitted to the following constraints:

1. Length of M2 gate=length of M1 gate
2. Width of M2 gate=N*width of M1 gate where "N" is an integer. The size dependencies are logical constraints for a physical layout generator. Hence if the length of M1 is a variable for the optimizer, M2 will be assigned the same variable. If width of M1 is a variable, then width of M2 will be an integer multiple of M1 width.

Traditionally, a designer manually sets the variable dependencies and the value ranges of each variable manually for use of a sizing tool or of a circuit optimizer. By identifying structures, Constraint Assistant can automatically suggest the appropriate logical constraints and value ranges for each logical constraint and for each structure.

Figure 12:
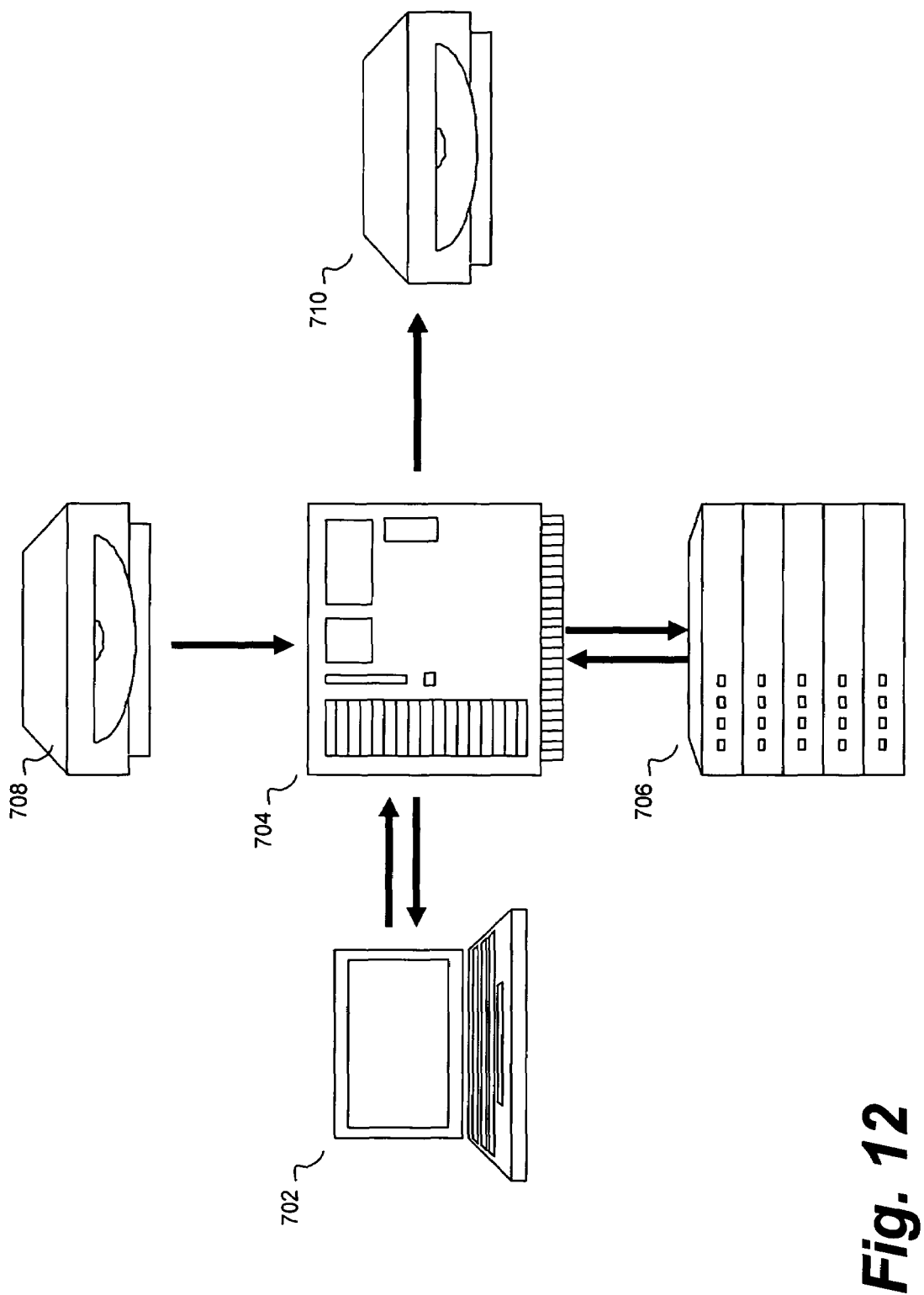
FIG. 12 illustrates an embodiment of a system implementing the invention.

Before describing the invention in further detail, it is useful to describe an example environment in which the invention can be implemented. One such example environment is a computer-based system for performing computer-aided design and design analysis. FIG. 12 illustrates an example implementation of such a system that can be utilized to implement computer-aided design and design analysis. The system includes one or more user interfaces (for example, "graphical user interfaces" also known as "GUIs") that can be implemented, for example, at terminal 702, a processing capability (represented by processor 704), and one or more storage devices, which are represented in the diagram as media drives 708, 710, and memory 706.

In this example environment, a designer would typically use the GUI, for example, to review and modify schematics or physical circuit layouts, in addition to communicating with the computer-aided design and analysis software that is running on processor 704. Processor 704 can implement the various methods and operations of the computer-aided design and design analysis software that is stored in a memory 706 that communicates with processor 704. Drive 708 is an example of one of a variety of ways to import data such as circuit schematic drawing descriptions for use by the system. Such data could also be imported through electronic or photonic communication lines or other channels. Outputs of the system, for example data files representing physical circuit layouts, can be recorded on media at drive 710, or alternately can transmitted electrically or photonically over communication lines or other channels. Although illustrated as two separate drives 708 & 710, input and output functions can be performed using a single drive or a single communication channel. As would be apparent to one of ordinary skill in the art after reading this description, alternative architectures and configurations can be utilized to implement a computer-aided design and design analysis system.

Circuit designers have long known a variety of circuit layout techniques to minimize component characteristic variations owing to process, thermal, and electrical environment variations as discussed above, especially for ICs, but also for conventional circuits. For example it is often important that differential transistor pairs match closely so that they will provide low-offset differential gain. A common layout technique to improve transistor matching is to split each transistor of a differential pair into two parallel transistors in a "cross-connected quad" arranging the parallel halves of each of a pair transistors in diagonal opposition to the other pair to electrically average characteristic variations due to placement and spatial variation.

Computer-aided circuit design and design analysis tools can be implemented to run on the example system illustrated in FIG. 12, and can assist designers, especially working with today's circuit designs, which have grown larger and more complex. Such tools can include circuit schematic capture tools, circuit layout tools, and circuit simulation tools. Generally such tools are provided as part of an interoperable suite of applications. An example of such a design suite is the Virtuoso® Custom Design Platform licensed by Cadence® Design Systems, Inc. After reading this description, however, it will be apparent to those of ordinary skill in the art how alternative tools can be implemented.

Such design suites may be distributed to users as software that typically runs on workstation/operating system platforms such as, for example, Sung/Solaris®, HP®/HP-UX, IBM®/IBM-AIX, and high-end PCs running Windows® or Linux®, although more "custom" solutions can be provided as well. Such workstations can include graphical user interfaces ("GUI"s) including of graphics displays, and user data input capabilities—usually a keyboard and mouse, although other options such as touch screens or electronic drawing tablets are also available. The workstations typically have one or more electronic processors for data manipulations and calculations, and memory storage for programs and data. Very often, workstations are networked so that they can communicate with one another, or with a network having other types of devices such as photo mask plotters or automatic circuit test equipment.

For a typical circuit design sequence, a designer typically starts with a circuit schematic, entered using a schematic capture tool, or imported as a data file and displayed, reviewed, and edited using a schematic editing tool. A designer then simulates the performance of the circuit using various models for the circuit's components with a circuit simulation tool. Circuit simulation tools work at various levels of component model abstraction, from physically-based low level models to high-level behavioral or timing models.

Once the designer has checked with the circuit simulator that the circuit topology is adequate to meet the circuit specifications, he might use a circuit optimizer to size the components of the circuit. Sizing will ensure all specifications and other goals are met versus process parameter variations, operating ranges and hence guaranty a better manufacturing yield. For advanced optimization, the designer may use an optimizer that take into account parameters from the physical implementation.

Once the circuit schematic design has been optimized, the designer usually proceeds to a preliminary physical circuit layout using a circuit layout tool. The physical circuit layout will eventually be used to generate a mask set for wafer or PCB fabrication, but this preliminary layout is used to obtain parameters for more accurately modeling the circuit's components and their interconnections. Circuit simulation based on the more accurate component and interconnection modeling is then used to further optimize the schematic design, now associated with the particular layout, for desired performance. Very often, different physical circuit layout options will be considered and tested using simulation.

Physical circuit layout is not usually done from scratch, but instead using a hierarchical design library of scalable components and different types of "subcircuits," thereby saving a great deal of labor. A "subcircuit" is a fragment of a circuit that has defined interface nodes (or equivalently, "terminals" or "pins") to other circuits or other subcircuits, that may occur repeatedly, sometimes with different component scaling, in a circuit design. Subcircuits may be more or less complex. Some Circuit designs, particularly those with many digital circuit functions, draw subcircuit designs from libraries having hierarchies going up to the very large and complex: for example, the level of complete microprocessor. This is often possible for digital circuits because circuit performance margins are typically high enough compared with the electrical component characteristics variations to allow a circuit designer to work at a high level of circuit abstraction (e.g. at the logic gate level, or even at the register transfer level).

Examples of subcircuits that an analog or mixed-signal circuit designer may deal with at low-levels can include: differential transistor pairs; parallel transistors; connections of transistors in different common node configurations (e.g. common gate, source, or drain configuration for field effect transistors "FETs"; or common emitter, base, or collector configuration for bipolar junction transistors "BJTs"); cascode transistor pairs; current mirrors; cascode current mirrors; current sources; active loads; buffer amplifiers; inverting amplifiers; transmission gates; logic gates; comparators; latches and flip-flops; analog multipliers; capacitor arrays;

resistor arrays; and power distribution, biasing, and grounding networks—to name just a few.

Subcircuits, here, can also designate various associations or patterns of components, nets and/or pins that might have no common interconnect, such as symmetric pairs, families of components with the same orientations or group of components with the same size. The name "subcircuit" stands for any group of components, nets and/or pins that the designer might need to identify with any specific set of criteria.

Analog and radio frequency circuit designs often have performance requirements that necessitate a circuit designer's working at the low-level subcircuit, and physical layout design levels simultaneously. This is part of the fabled "artistry" of analog circuit design, meaning that physical circuit layout choices such as component placement and orientation for a given circuit or subcircuit often require high levels of designer experience to achieve good circuit performance and fabrication yield. This requisite designer's experience includes an understanding of critical component characteristic balancing requirements for components in various types of subcircuits, along with an understanding of how an IC's fabrication process variations and the thermal and electrical environments of individual components within a circuit affect component characteristics.

To make a physical layout more compact, the layout engineer will likely group together all components of same type and same size, to create regular arrays. Depending on the functionality of the components inside the array and because of matching requirements, the ordering of the devices in the array may be imposed accordingly.

Often, different designers will be responsible for the circuit design and for the layout design. In such cases the circuit designer may annotate a circuit schematic to identify subcircuits having special layout constraints (e.g. symmetries, device matching, orientations, and placements of components, interconnect, and isolation wells and guard rings) for subsequent use by the layout designer.

Computer-aided layout design tools are now available that can automatically generate circuit layouts from circuit schematics. In cases where such automatic layout tools can generate layouts subject to special constraints, the circuit designer or someone else must manually enter the desired layout constraints into the automatic layout tool. This process is time consuming and error prone. An example of such a layout design tool is the Virtuoso® Neocell Analog Physical Synthesis product licensed by Cadence Design Systems, Inc.

Computer aided design tools intended primarily for use in digital circuit design sometimes have the capability to recognize subcircuit "netlists" as logic gates, so that they may be replaced by higher-level behavioral models for more efficient simulation, and in some cases automatic layout. (A "netlist" is a listing of all nodes in a circuit, along with the component and other nodes that each component is connected to. A netlist is typically, but not necessarily, represented in matrix format. Sometimes connection graphs of nodes are used in place of matrices.) For such digital circuits, transistors are mostly minimum size only and are generally only used for one type of function, i.e. as switches. Isotherms, symmetries, coupling, matching, proximity, orientations, directions of current flows, and similar considerations are seldom significant for digital circuit layouts.

For circuits performing analog functions, transistors and other components generally have many different sizes and perform many different functions where specific details of their electrical characteristics are important for circuit performance. Isotherms, symmetries, coupling, matching, proximity, orientations, directions of current flow, and similar considerations are critical for such components. Criteria to apply appropriate physical circuit layout constraints to each component or group of components in a subcircuit or circuit can be very complex. Moreover, the same configuration of components may require different layout constraints for different circuit applications. Analog subcircuit-type identification is often difficult based on netlist examination, alone. This is because similar appearing circuit configurations may function in different operating modes for different circuit applications. For example, a differential transistor pair may function either as part of a generic input stage, a single-ended amplifier, a low offset differential amplifier, or a comparator—with essentially the same subcircuit netlist. Analog circuit designers often distinguish such different intended functions by observing formatting conventions when drawing or viewing circuit schematics. Heretofore there has been no effective means to assist an analog circuit designer with the automatic specification of physical circuit layout constraints based upon the identification of subcircuits in a schematic drawing.

Consequently an analog circuit designer may fail to identify analog subcircuits where layout constraints should be applied, or erroneously apply layout constraints to subcircuits. The manual specification of constraints in a form that can be used by a layout generator is an onerous and error prone task. This can result faulty circuit performance or suboptimum fabrication yield that cannot be detected until an expensive mask set has been obtained, and expensive and time consuming wafer lot fabrication and circuit testing are completed in addition to longer circuit design intervals. It is cost effective to minimize the time spent by designers in specifying layout constraints and reduce the likelihood of layout errors to minimize circuit development schedule and costs. It is additionally desirable to capture the physical circuit layout expertise of experienced designers so that it can be applied to the work of less experienced designers, as well as educate the less experienced designers without the expense resulting from physical circuit layout errors.

Figure 1B:
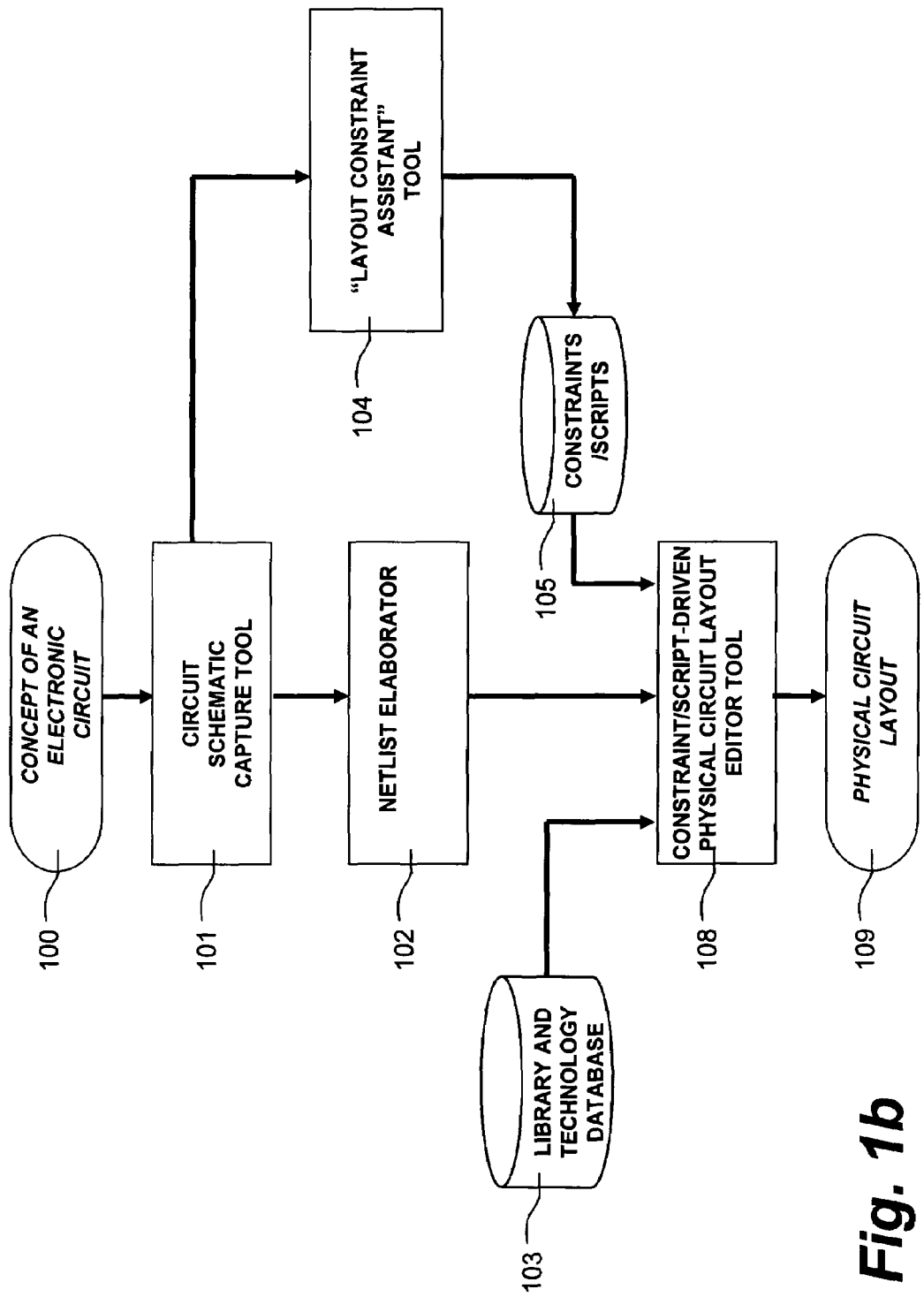
Figure 1C:
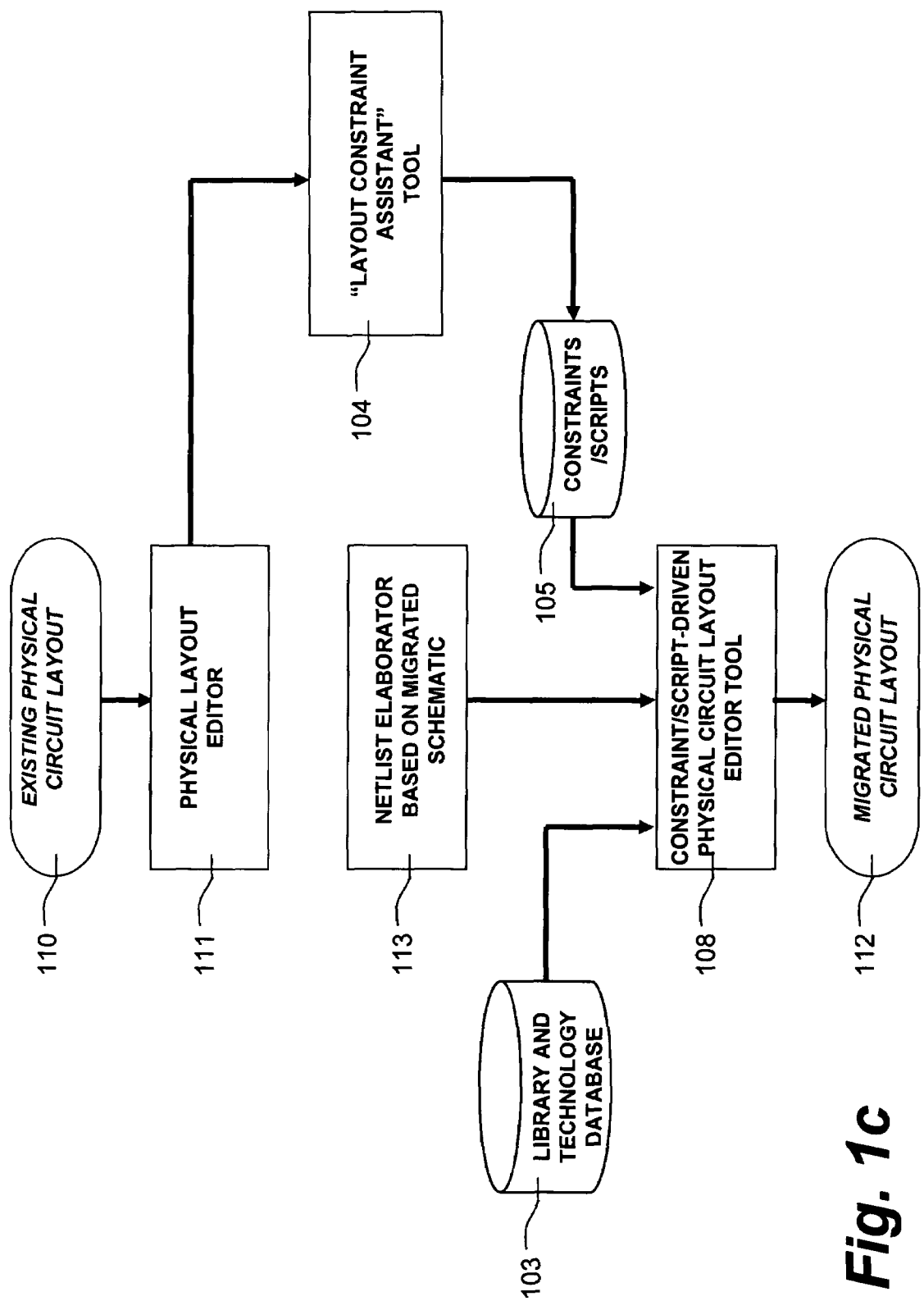

FIGS. 1a, 1b and 1c illustrate example implementations of a layout constraint assistant tool 104 in accordance with three embodiments of the invention. In the example of FIG. 1a, the concept of an electronic circuit 100 is captured, for example, by a circuit schematic capture tool 101. Netlist elaborator 102 further processes the captured schematic. The captured circuit schematic drawing can be converted to a data file that is readable by layout constraint assistant tool 104. Layout constraint assistant tool 104 can be implemented to generate logical constraints or a script 105 for circuit simulation and optimization. For circuit sizing, the logical circuit constraints can be passed to a circuit schematic sizing tool or optimizer 106. The optimizer can then generate a data file describing a sized circuit schematic 107. Sized circuit schematic 107 typically includes a "netlist" description, like the original schematic, but sizes of the components are optimized versus any set of goals. Such goal could be to create a compact layout and/or to reach high manufacturing yield. (A "netlist" is a list of electrical components in a circuit, or subcircuit, along with other electrical nodes that are connected to them. The optimized netlist can be used for physical implementation.) A library and technology database 103 is usually referenced by the constraint or script-driven physical circuit layout editor tool 106 to make use of pre-generated cells or parameterized cells according to the technology rules.

In the example of FIG. 1b, layout constraint assistant tool 104 can be implemented to generate physical circuit layout constraints. For physical circuit layout, the physical circuit layout constraints can be passed as another data file to physical circuit layout generation tool 108. Physical circuit layout generation tool 108 can be implemented to generate a data file describing a physical circuit layout 109. Physical circuit layout 109 typically also includes a "netlist" description. (A "netlist" is a list of electrical components in a circuit, or subcircuit, along with other electrical nodes that are connected to them. It can be implemented as a compact, analysis-friendly representation of how components in a circuit are interconnected. Other connectivity descriptions, such as connection graphs, may also be used. As used herein, "netlist" will refer to a netlist, as described above, or an alternate form of connectivity description.) A library and technology database 103 is usually referenced by the constraint or script-driven physical circuit layout editor tool 108 to make use of pre-generated cells or parameterized cells according to the technology rules.

In the example of FIG. 1c, layout constraint assistant tool 104 can also be implemented to generate physical circuit layout constraints, but as shown here, for migration from an existing physical circuit layout 110, accessible by a physical circuit editor tool 111, to generate a new physical circuit layout 112 targeting a new process and using new corresponding technology files. The netlist elaborator 113 would then be based on the migrated schematic. The migrated schematic would keep the original circuit schematic topology but would likely be sized according to new process data, simulation models and specifications.

Furthermore, one type of subcircuit may require the setting of both logical and physical constraints. For example, for the optimization of a circuit schematic made of symmetrical components, the designer must set logical constraints to make the size of one member of each symmetrical pair dependant and equal to the size of the other member of the same symmetrical pair. Simultaneously, the designer must set a physical constraint for each symmetrical pair for the physical circuit layout placement tool to place each member a symmetrical way. Additionally, the symmetry may require other physical constraints for the router to route interconnects symmetrically. The layout constraint assistant tool can ensure that both logical and physical constraints are created for all symmetrical pairs and for all concerned tools used in the design flow. Thus the layout constraint assistant tool can accelerate constraint entry and guaranty the consistencies of all constraint types along the design flow. Symmetry is only one example among many subcircuits types that require several sets of consistent constraints for multiple tools used in a circuit design cycle. Layout constraint assistant can track all these subcircuits and apply multiple and consistent constraints accordingly.

Figure 2:
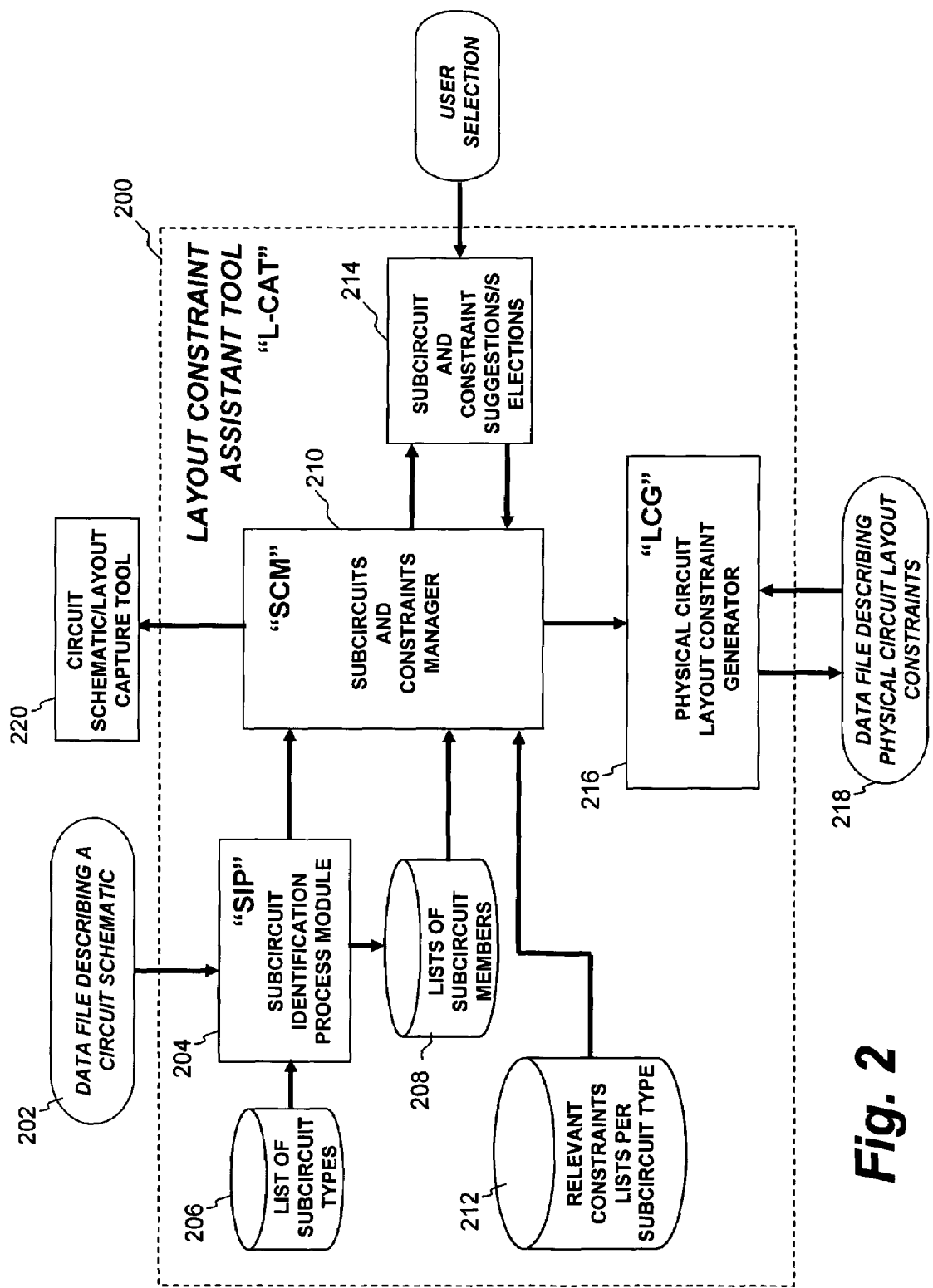
FIG. 2 illustrates functional modules of an embodiment of a layout constraint assistant tool.

FIG. 2 illustrates exemplary details of a layout constraint assistant tool 200 ("L-CAT" in accordance with one embodiment of the invention. A data file 202 describing a circuit schematic is passed to subcircuit identification process module ("SIP") 204. SIP 204 identifies lists of subcircuit occurrences within a netlist describing circuit schematic 202 by creating categorized lists of subcircuit members 208 by schematic symbols, nets, and/or pin identifiers that are together in a same subcircuit to designate nodes in a subcircuit netlist. Exemplary methods for designating schematic symbols based on placement and orientation are described below.

Once the identification process is complete, the subcircuits and constraints manager ("SCM") 210 maps each list of subcircuit member from the lists of subcircuit members 208 with an appropriate list of constraints from the relevant constraints list per subcircuit type 212. SCM creates lists of subcircuit and constraint suggestions 214 for the user. The user selects any pair of subcircuit and constraint from the subcircuit and constraint suggestions 214 and optionally asks SCM to apply the selected constraints to the corresponding subcircuit members. When SCM 210 is asked to apply a constraint, it passes both the selected constraints and the list of selected subcircuit members to the physical circuit layout constraint generator ("LCG") 216. The LCG generates the data file describing physical circuit layout constraints 218 with the selected constraints for the selected members. To improve visibility, the L-CAT can highlight elements to which the suggested constraint can apply either in a circuit schematic capture tool 220 displaying the graphical representation of the corresponding data file 202 or in a physical circuit layout editor or eventually in both for cross-probing, that is for simultaneous highlighting.

In one embodiment, the L-CAT can be provided with a default, general purpose circuit design library from a computer-aided design product's developer. It may further have the capability to be modified by a user, for example, with an open list of subcircuit types 206 and/or open relevant constraint lists per subcircuit type 212 to accommodate layout constraint recommendations for different IC fabrication process libraries, circuit applications, circuit development projects, or circuit designer preferences, or for different sets of constraint-driven software products.

Figure 3:
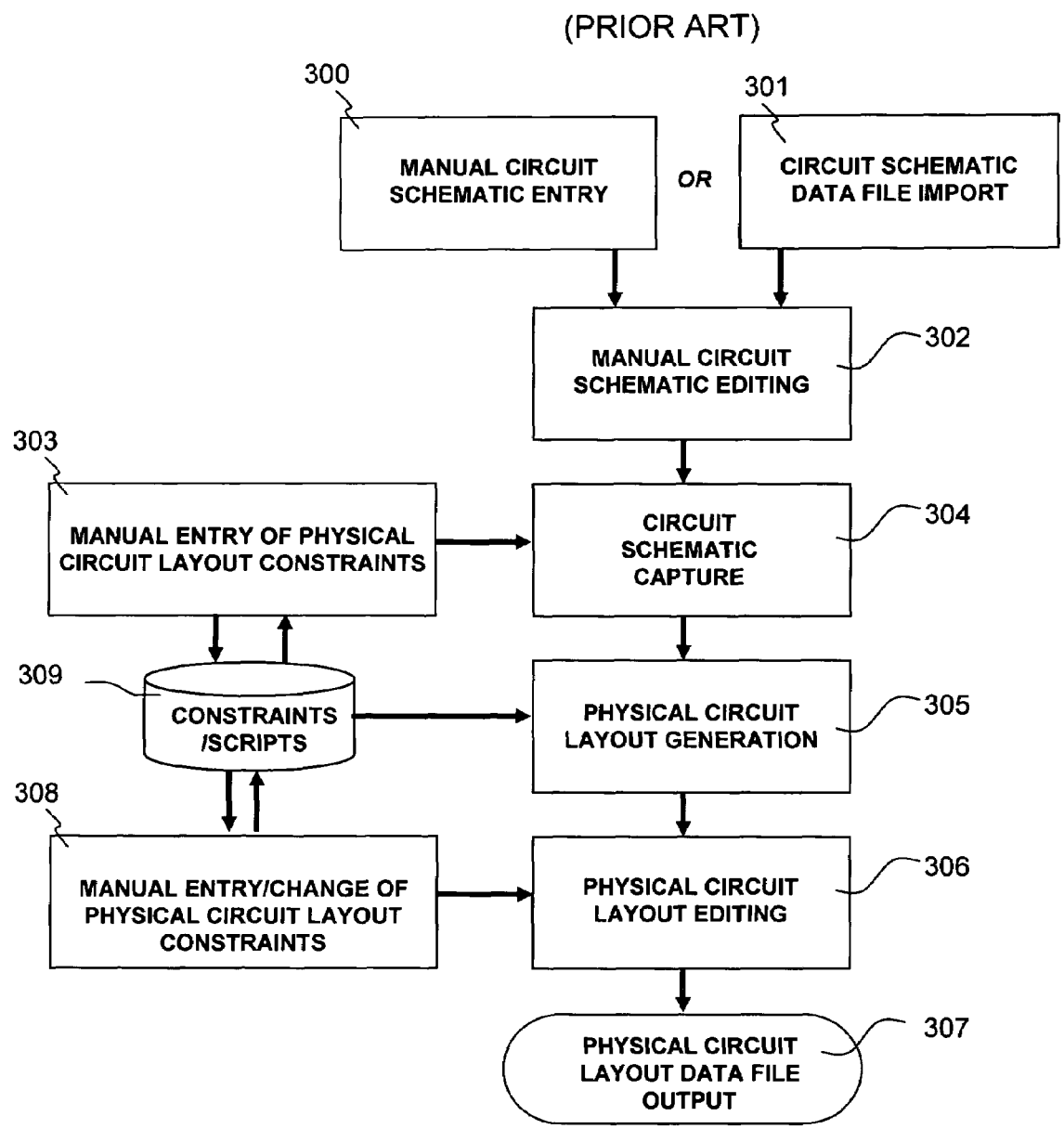
FIG. 3 is a process flow diagram illustrating an exemplary process of creating a physical circuit layout from a circuit schematic drawing.

FIG. 3 is an operational flow diagram illustrating an example process of current manual constraint entry for the automatic generation of a physical circuit layout from a circuit schematic. A schematic editor 302 receives the circuit schematic drawing, for example, either from manual circuit schematic entry 300 or as an imported data file 301. Schematic editor 302 can then be used to graphically review and edit the schematic drawing, if desired. The Virtuoso® Schematic Editor, licensed by Cadence Design Systems, Inc. is an example of one such schematic capture tool that can be utilized. After reading this description, however, it will be apparent to those of ordinary skill in the art how alternative tools can be implemented.

Schematic editor 302 optionally provides capabilities for user-configurable rule check to identify drawing and electrical rule violations, such as shorted connections, unconnected inputs and outputs, and consistence of node naming conventions. Such a rule checker can allow a designer to check, for example, circuit connections throughout an entire design to make sure that node names are matched throughout and that connections are completed. It could also check to determine whether connection labeling had been done properly and whether there are unmatched connections.

Typically circuit schematic inputs may be either manually entered by a designer through the GUI, or imported as part of formatted data file for subsequent inspection and optional modification. Importable data file formats include, without limitation, EDIF 2 0 0 netlist, Circuit Design Language (CDL), SPICE, VHDL IEEE 1076-1993, Verilog® IEEE1364, and OpenAccess® data objects.

Referring to FIG. 3, manual entry of physical circuit layout constraints 303 allows setting physical constraints to schematic components if the physical circuit layout generation tool 305 can be driven by such constraints. The Virtuoso® Neocell Analog Physical Synthesis tool is an example of a physical circuit layout generation product which operates under constraints and provides a constraint editor that stores them in a schematic database. Unfortunately, manual entry of physical constraints 303 is typically tedious, time consuming, and error prone. The usual constraint editor requires that the user manually selects the components to which a constraint is to be applied. The user must also manually select a constraint among all possible constraints before applying it. This carries the risk of selecting the wrong elements or accidentally missing a component in the selection. Erroneous constraints may be applied by mistake, too. If the layout generation tool 305 does not offer a constraint editor, then layout constraints can only be entered at a later stage with manual entry of physical circuit layout constraints.

Referring again to FIG. 3, circuit schematic capture tool 304 converts the schematic drawing to a data file. The Virtuoso® Schematic Editor can also perform this function, although after reading this description, however, it will be apparent to those of ordinary skill in the art how alternative tools can be implemented. Typical output data file formats from a schematic capture tool can include, for example, EDIF 2 0 0 netlist, CDL, SPICE, Cadence® CDBA database, and OpenAccess® database.

The input and output data file formats listed above are industry standards, de facto or otherwise, and are well documented in the open literature. Other data file formats may also be used, although it is desirable that they contain appropriate netlist and component description information.

Physical circuit layout generation tool 305 in FIG. 3 receives the data file from circuit schematic capture tool 304, and preferably generates a physical circuit layout. The Virtuoso® Neocell Analog Physical Synthesis tool is an example of a physical circuit layout generation tool. After reading this description, however, it will be apparent to those of ordinary skill in the art how alternative tools can be implemented.

Layout generation tool 305 can be implemented to translate data files describing analog schematics into data files representing physical circuit layouts that may be optimized using well known algorithms for maximizing attributes such as, for example, device grouping and interconnection density, while minimizing attributes such as signal propagation latency, number of interconnection levels, cross-talk among interconnections, and power dissipated in interconnections. The layout generation tool 305 (the Virtuoso® Neocell Analog Physical Synthesis product is an example) further implements physical circuit layouts. Such layouts may be subject to additional constraints that can be specified through manual entry 308 or otherwise, relating to, for example, isotherms, symmetries, coupling, matching, proximity, orientations, directions of current flows, and similar considerations as discussed above.

The data file representing a physical circuit layout is then often passed to a physical circuit layout editor 306, for reviewing and revising, if desired. Resulting physical circuit layout data file 307 can then be used for subsequent processing such as design rule checking and photo mask fabrication.

Figure 4:
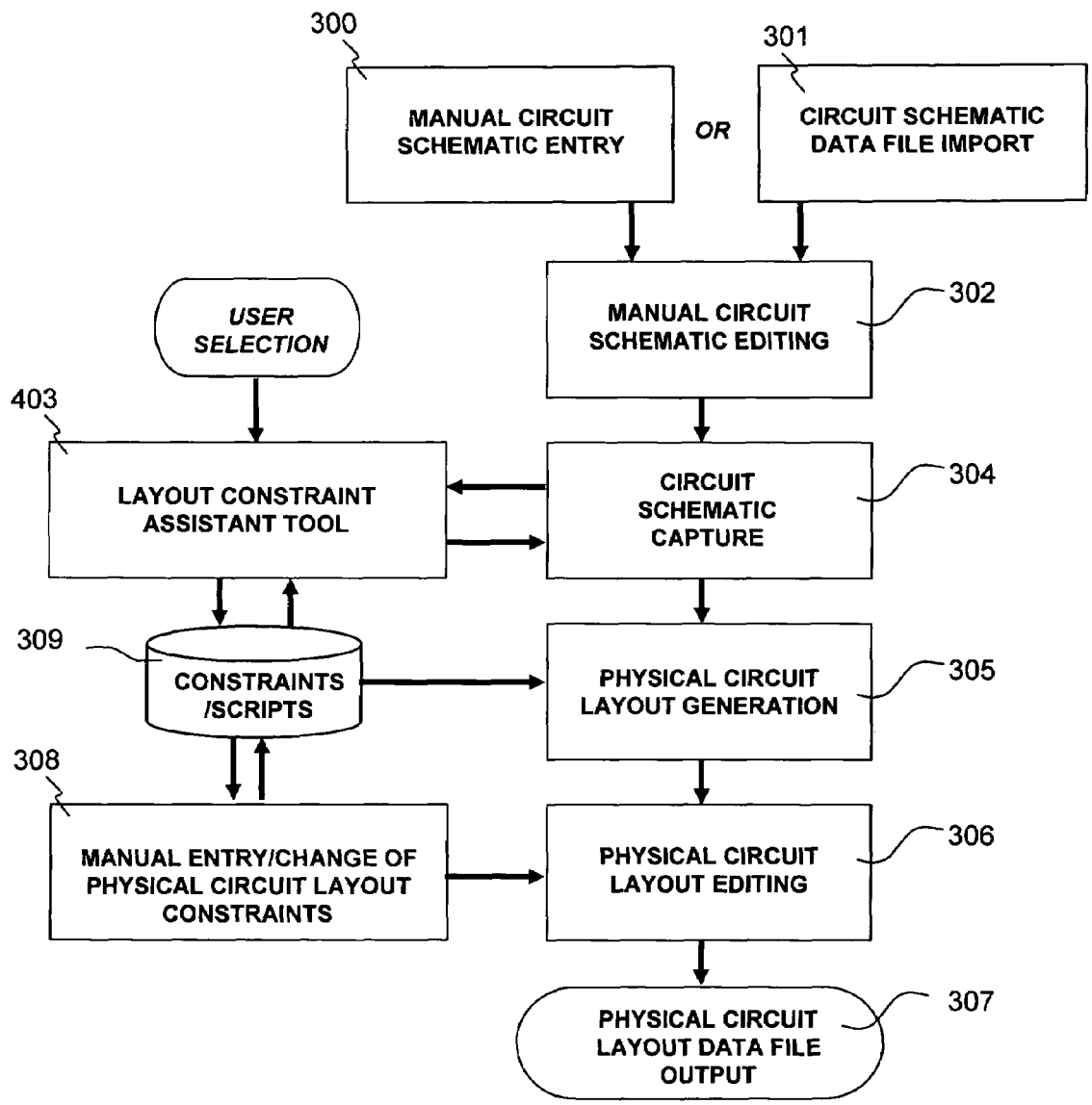
FIG. 4 is a process flow diagram illustrating an exemplary process of creating a physical circuit layout from a circuit schematic drawing, using an embodiment of a layout constraint assistant tool.

FIG. 4 is a process flow diagram illustrating an alternate process for the automatic generation of a physical circuit layout that has been modified to include an embodiment of an L-CAT 403. This can be included to reduce the need for the manual entry of layout constraints, thereby potentially reducing work time and the occurrence of errors. The database of schematic capture tool 304 may be accessed by L-CAT 403 for subcircuit or pattern identification and for highlighting. Elements identified as members of the subcircuit/pattern types may be mapped to lists of relevant logical or physical constraints. All possible combinations are offered to the user for his selection. Constraints or scripts 309 can be written based on a user's choices. Optionally, constraints or scripts may be read by the L-CAT and constraint elements may be highlighted in a schematic by the user. After this, the process proceeds as described above in connection with FIG. 3. Drawing elements with the same numbers in FIGS. 3 and 4 may be identical in some embodiments of the invention.

Instead of selecting devices, nets or pins in schematic, then selecting the constraint in the constraint editor to apply the constraint, the designer selects the candidates for constraints, the constraint to be applied and the command to apply that constraint directly in the same form. The layout constraint assistant tool filters the possible choices for candidates and for corresponding constraints to a minimum, hence limiting the risk of errors and hastens the entry of the constraints by the designer.

Figure 5:
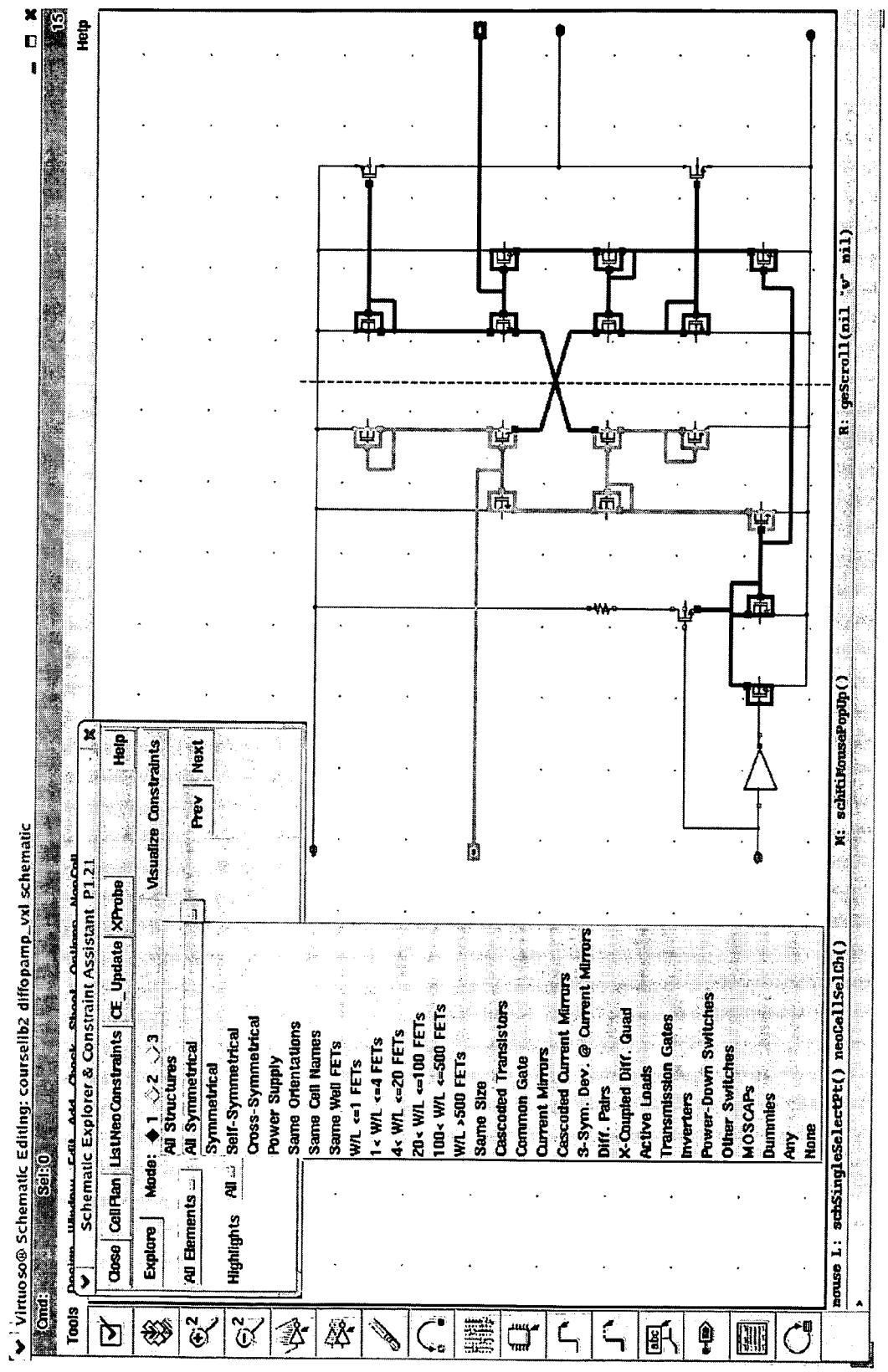
FIG. 5 illustrates a graphical user interface ("GUI") computer display of physical circuit layout constraint options for selection by a user along with highlighted corresponding features of a schematic drawing.

As discussed above, one or more GUIs can be implemented to aid user interface. FIGS. 5 through 9 present several examples of such GUIs that can be implemented with the present invention. FIG. 5 illustrates an example of a graphical user interface ("GUI") that can be implemented in accordance with one embodiment of the invention. The example GUI illustrated in FIG. 5 displays a list of subcircuits and patterns, along with a schematic drawing that has highlighted components, nets and pins with symmetries, self-symmetries or cross-symmetries to which a selected layout constraint applies. This can help the designer to verify that appropriate schematic features have been assigned appropriate corresponding layout constraints. The GUI can further provide for the interactive highlighting of schematic features through a user's designation of a particular layout constraint from a displayed list.

Figure 6:
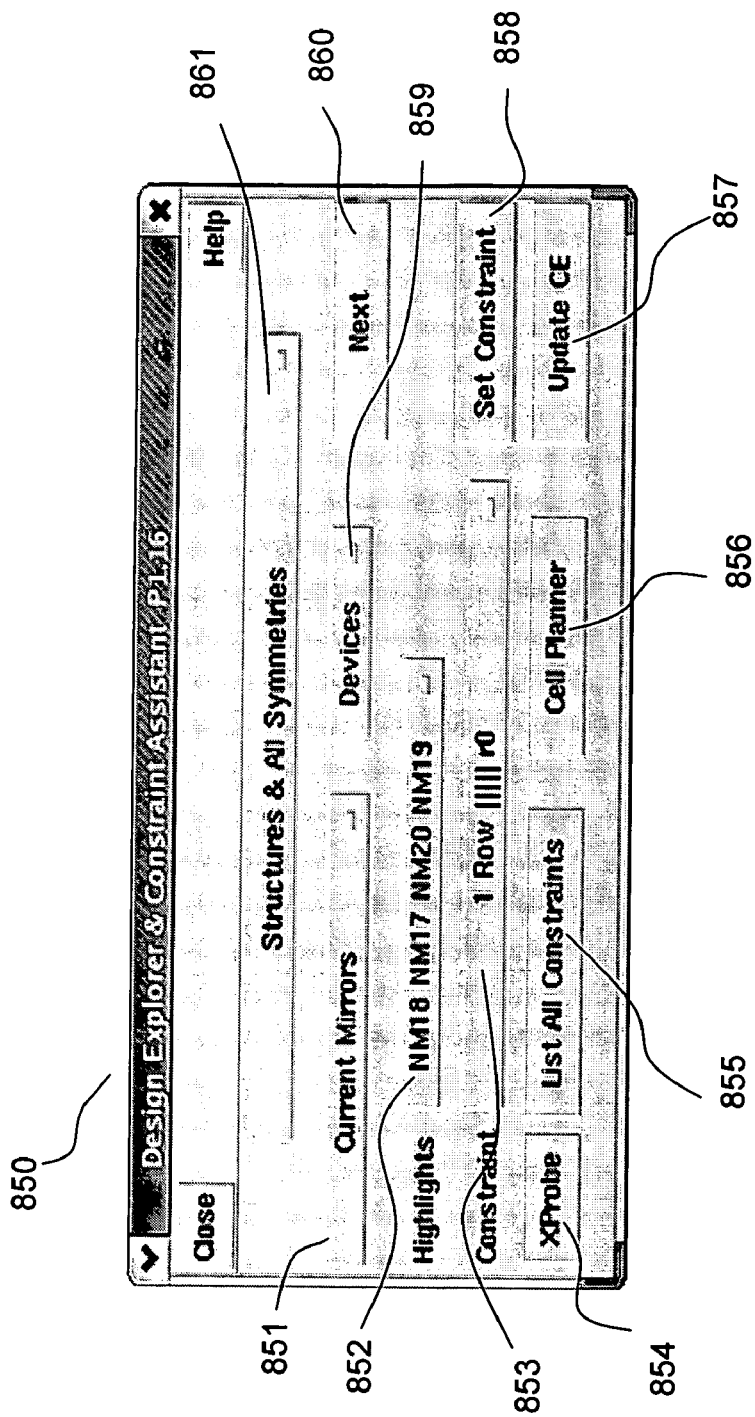
FIG. 6 illustrates an implementation of a GUI dialog box of a layout constraint assistant tool.

FIG. 6 illustrates an example of a GUI dialog box that can be implemented in accordance with one embodiment of the invention. The GUI dialog box 850 illustrated in FIG. 6 provides a variety of information in a compact format by using function buttons and drop-down lists for selection of alternatives. The compact format is useful in that it can allow other simultaneous GUI displays such as a circuit schematic drawing and a physical circuit layout to be unobscured, or just partially obscured, from view. Button 861 displays the current exploration mode of the scanned schematic or layout view. Button 860 changes to a next "member" (identified element or list of elements) within the category. Button 851 displays the detected subcircuit, structure, or circuit symmetry type, and provides a drop-down list to optionally choose an alternate type. Button 859 displays the circuit element type for the physical circuit layout constraints, and provides a drop-down list to optionally choose an alternative type. Other element types include, without limitation, "nets," "net segments," "pins," or terminals. Button 852 displays identifiers of elements to which a particular layout constraint can be applied, and provides a drop-down list for alternate selection among the whole list of members for the active structure/subcircuit type under button 851. Button 853 displays the layout constraint that can currently be applied, and provides a drop-down list for alternate selection. Button 854 toggles between enabling or disabling a cross-probing display mode in which identified circuit features can be simultaneously highlighted in circuit schematic drawings and physical circuit layout depictions. Button 855 brings up a list of all currently accepted physical circuit layout constraints for review. Button 856 launches a cell layout planner, a graphical tool to assign physical locations to devices or groups of devices. Button 858 applies, when pressed, the displayed physical circuit layout constraint to a designated circuit member. As would be apparent to those of ordinary skill in the art after reading this description, one or more of these above buttons may be removed, other buttons can be substituted, or additional buttons may be added while accomplishing the desired aspects of the invention.

Figure 7:
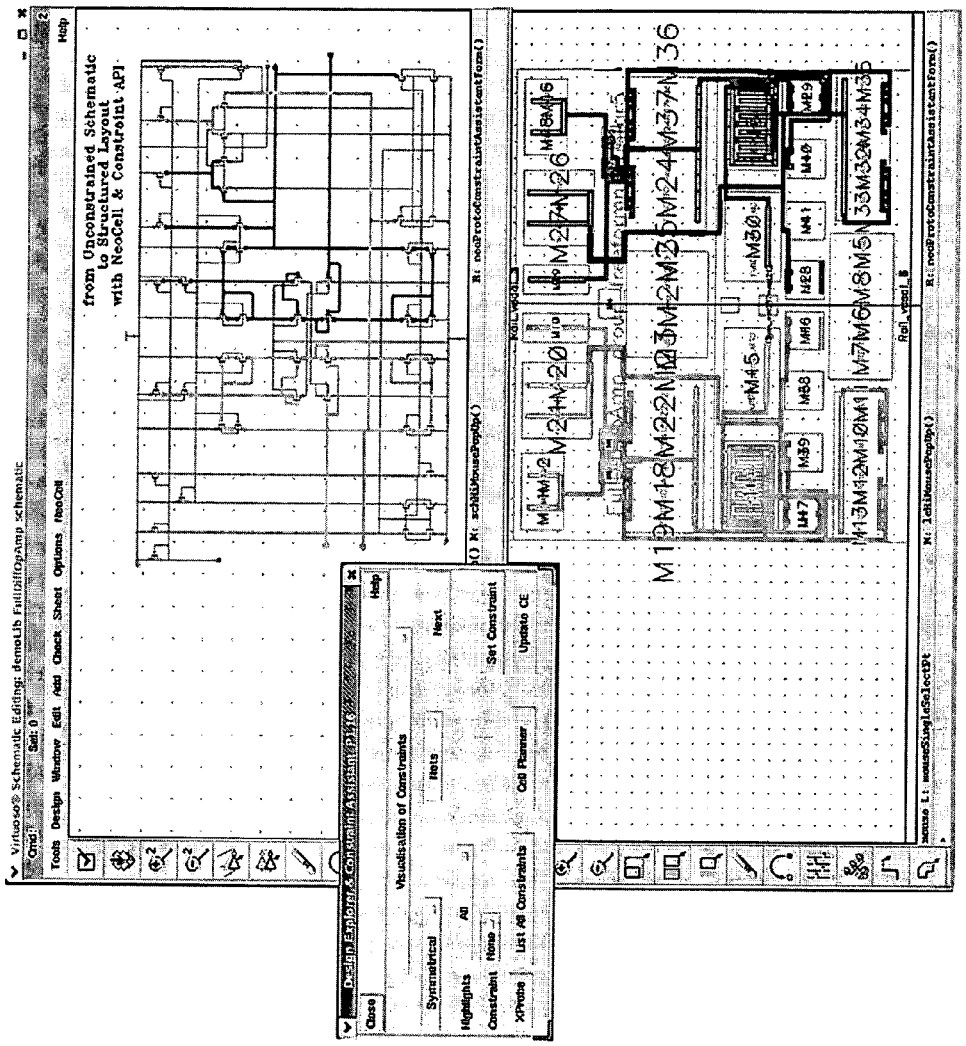
FIG. 7 Illustrates an implementation of a GUI of an layout constraint assistant tool showing a GUI dialog box, and a circuit schematic drawing with a physical circuit layout drawing, showing highlighted corresponding features.

FIG. 7 illustrates an example of yet another GUI that can be implemented in accordance with another embodiment of the invention. In this embodiment, a dialog window is simultaneously displayed with a circuit schematic drawing and a physical circuit layout depiction. In this case, circuit features to which a layout constraint is applied can be simultaneously highlighted in both the circuit schematic drawing and the physical circuit layout depiction.

Figure 8:
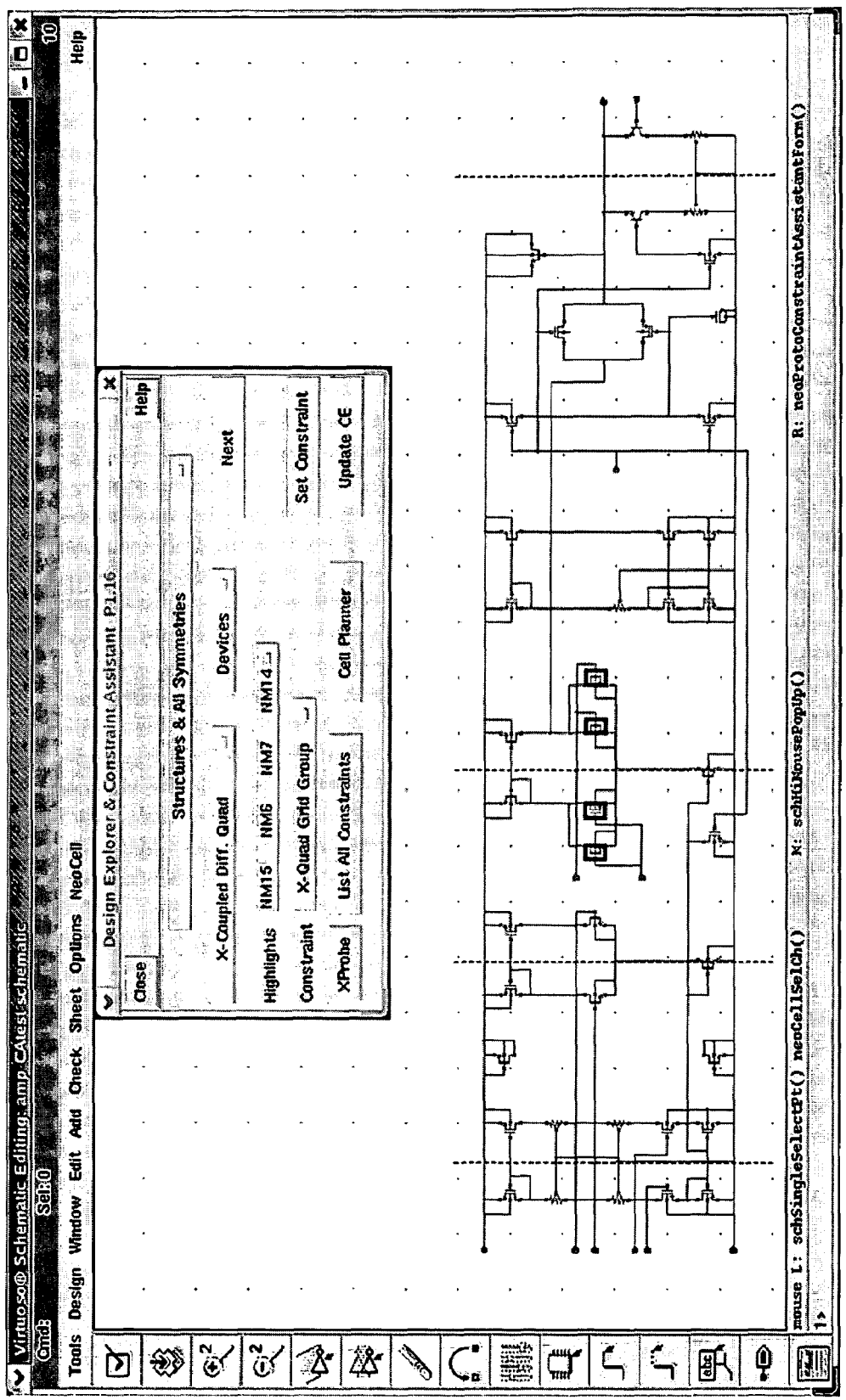
FIG. 8 illustrates an implementation of a GUI of an layout constraint assistant tool showing a GUI dialog box and a circuit schematic drawing with highlighted corresponding features for a cross-connected pair of common-source MOSFETs.

FIG. 8 illustrates an example of another GUI that can be implemented in accordance with another embodiment of the invention. The drawing illustrates a highlighted schematic drawing used for test structures and a corresponding GUI dialog box. In this example, a differential pair of common source connections of two parallel transistors has been identified and highlighted on the schematic drawing, as discussed above, and an X-Quad (cross-coupled transistor pair, as described above) layout constraint has been selected for application to a physical circuit layout of the corresponding transistors.

FIG. 9, which comprises FIGS. 9A, 9B, and 9C, illustrates still another example GUI that can be implemented in accordance with one embodiment of the invention. FIG. 9A illustrates a part of a schematic made of resistors connected in series in a highlighted schematic drawing. FIG. 9B depicts an example GUI dialog box, identifying that the subcircuit in the schematic drawing has been identified as same size serial resistors, and that a "serpentine" layout has been recommended. FIG. 9C illustrates the physical circuit layout display as created by the layout constraint. The alternate orientations of the resistors, together with the side-by-side positioning in a one-dimensional array of the physical devices, spaced by the minimum distance allowed by the design rules of the targeted process, are the concrete implementation of the serpentine resistor layout.

Figure 10:
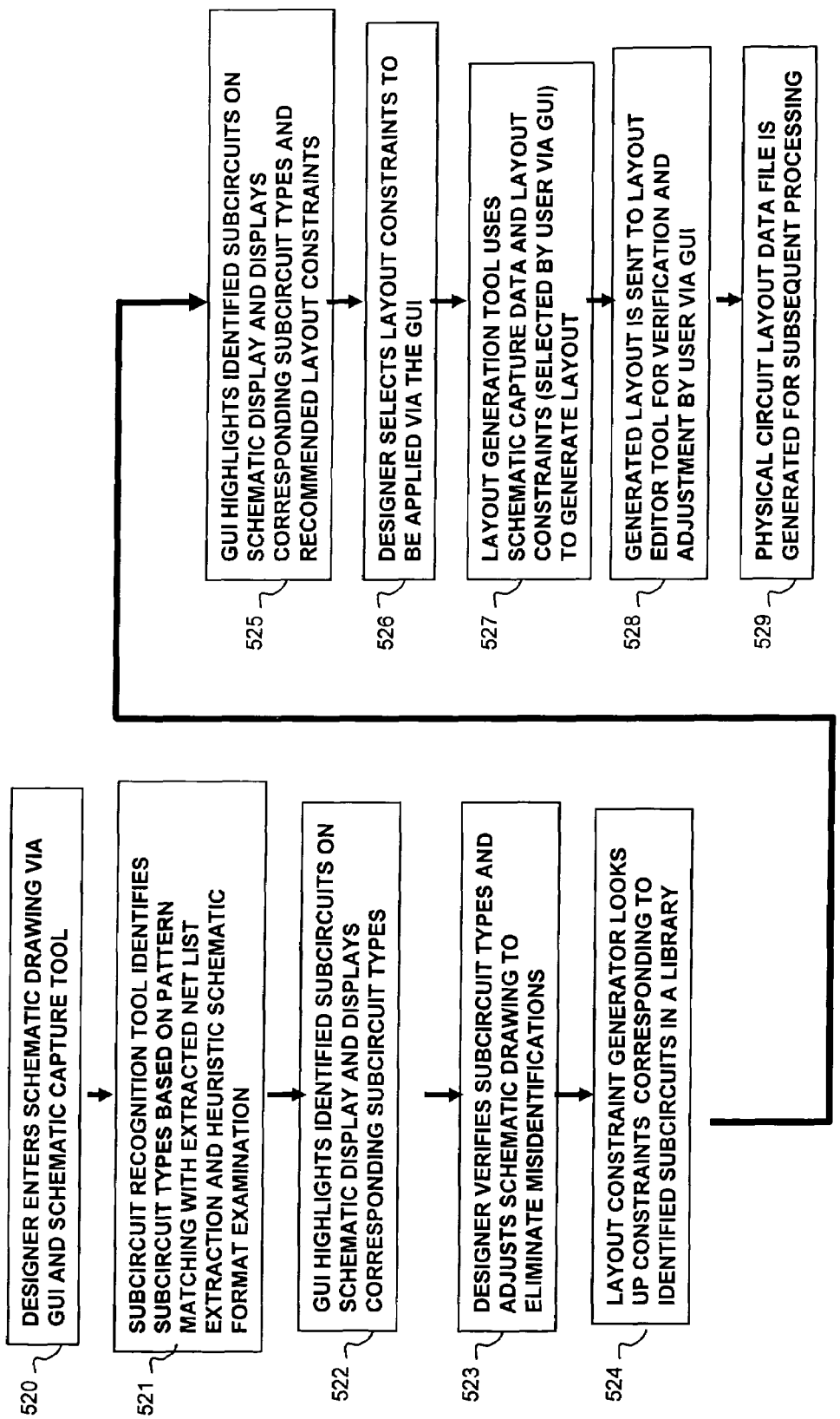
FIG. 10 illustrates the steps involved in creating a physical circuit layout using an layout constraint assistant tool.

FIG. 10 presents a more detailed example of using another embodiment of the invention to generate physical circuits from circuit schematics. Step 520 is schematic capture, followed by step 521, subcircuit recognition. In this example, circuit designer checks 522 that subcircuit types have been correctly identified, and optionally adjusts the schematic drawing to encourage or discourage subcircuit identifications using schematic drawing conventions often common to the drawing of specific subcircuits. The LCG suggests and optionally generates layout constraints (step 524) corresponding to the identified subcircuits' type. In step 525, the layout constraints corresponding to the identified subcircuit types are simultaneously displayed on the GUI with a highlighted circuit schematic drawing. The designer can select layout constraints to be automatically applied to the physical circuit layout via the GUI in step 526. The layout generation tool then generates 527 a data file representing a physical circuit layout, applying the layout constraints. In step 528 a layout editor is used to view, and revise as desired, the physical circuit layout that is finalized as a data file for subsequent processing in step 529.

Figure 11:
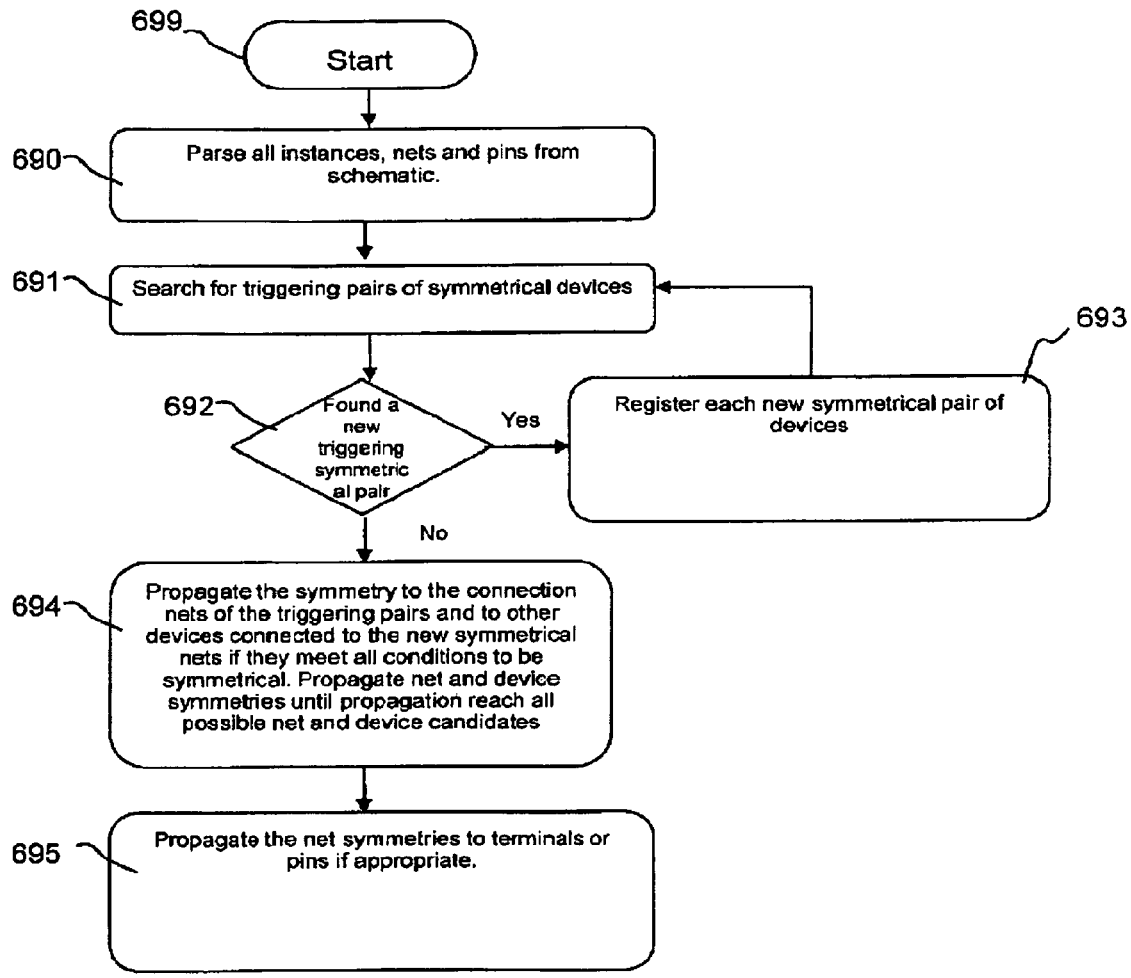
FIG. 11 is a flowchart of an embodiment of a process to detect schematic component layout symmetries based on differential pair transistors.

FIG. 11 is an operational flow diagram illustrating the operation of a layout constraint assistant tool in accordance with one embodiment of the invention to identify symmetries from a schematic. In step 690, a data file representing a captured schematic is parsed for occurrences of subcircuit features that resemble, for example: ground, bias, or power connections; and components connected in parallel. Supply net names could also be reserved names or names provided as attributes either as part of the schematic database or in a separate file.

Step 691 of FIG. 11 searches for FET (or BJT) transistor pairs that have not been identified as parallel components but are connected as differential pairs, that is the transistors have common source (or emitter) pin connections, but different gate (or base) pin connections and different drain (or collector) pin connections. Additionally, the common source connection must not be a supply net. Such determination can be based entirely on the connectivity information included in a usual netlist.

Differential transistor pairs can be conditionally recognized on the basis of schematic drawing format. As an example, two transistors with the same schematic symbol Y coordinate position, of the same type and size, but of opposite relative horizontal orientations in the schematic drawing with the same connectivity criteria as described above is conditionally recognized as a differential pair. (In all of the discussions herein, the "same" x coordinate or the "same" y coordinate refers to within a defined tolerance of an exact position.) Typically for two MOSFETs, "same size" means the same gate length, the same gate finger width, and the same number of gate fingers, subject to a scaling factor.

As another exemplary embodiment, two transistors represented by schematic symbols with the same X coordinate position, of the same type and size, but having opposite horizontal orientation in the schematic drawing are conditionally recognized as a differential pair. In yet another embodiment, differential pairs are conditionally recognized by being of the same type and size, and having schematic symbols that have closely spaced X and Y coordinates and the same orientation.

As discussed above, a differential pair can be recognized on the basis of netlist examination, or may also be identified together with the format of the circuit schematic drawing. A circuit designer, that knows the identification criteria, can easily designate transistors as differential pairs by adjusting the circuit schematic drawing format.

Additionally, besides differential pairs, other pairs of components can be detected, in step 691, as triggering pairs for symmetries. Such a triggering pair can be made of two devices, with same name or type (like same type of resistors or same type of bipolar transistors), with positions in schematic using either same X or same Y coordinate (exactly or within a given tolerance), without any other component placed in between, with same sizes and with mirrored orientations. FIG. 5 shows an example of symmetries where no differential pair is present and where symmetries are detected from the mirrored orientations of four pairs of MOS transistors placed close to the symmetry axis (drawn as a dashed line) and where members of each pair are separated by that symmetry axis.

Referring again to FIG. 11, as differential transistor pairs or other symmetrical pairs are identified, a vertical symmetry axis for the schematic is generated at the average X coordinate value of the schematic symbols representing the pair of transistors if they have nearly identical Y coordinate positions, or a horizontal symmetry axis for the schematic is generated at the average Y coordinate value of the schematic symbols representing the pair of transistors if they have nearly identical X coordinate positions. This is illustrated by steps 692 and 693. This symmetry axis position is passed back to the symmetrical pair search engine 694 to further identify connected components that have mirror symmetry about the vertical symmetry axis but with either the same Y or same X coordinates, and if none of the examined component is part of an already identified pair of symmetrical components, thereby searching for additional components in the circuit schematic that are less proximate to one another but placed with deliberate symmetry. Such symmetrically positioned, connected components are likely to have corresponding requirements for physical circuit layout. Therefore, in step 694 these components are searched for and identified. In this way the discovery of symmetries in circuit schematics tends to propagate from components in close proximity to components that are more distant from one another, thereby increasing the likelihood of correct subcircuit identification.

In step 694, nets connected to symmetrical components are similarly examined. If appropriate, a common net is identified as self-symmetrical net and pairs of nets are identified as pairs of symmetrical nets or as pairs of cross-symmetrical nets. In this manner, symmetrical nets iteratively propagate symmetries first to active instances which are close X and Y-coordinate neighbors with or without a tolerance for coordinates. These tolerances may increase for subsequent iterations. Then symmetrical nets propagate symmetries to other matching transistors. New symmetrical instances generate eventually new symmetrical/cross-symmetrical pairs of nets and/or new self-symmetrical nets. Symmetries are propagated to active instances with matching parameters and at a same distance from a defined axis of symmetry with successive iterations increasing the tolerance for coordinates. Individual instances connected to a pair of symmetrical nets in balanced positions are defined as self-symmetrical. Then propagation of component and net symmetries is applied similarly to passive components. The propagation of symmetry is done iteratively with expanded tolerances for criteria of relative positions until all instances and nets are processed.

Finally, in step 695, pins connected to symmetrical nets are defined as symmetrical too.

In another embodiment, the orientation of schematic symbols representing components, either referenced to the overall drawing's orientation or referenced to the orientation of other schematic symbols in the drawing, can provide information regarding the component's likelihood of being in a same subcircuit. For example, schematic symbols for MOSFETs in a common-source differential pair often have opposite left-right orientations if they have nearly identical Y coordinate positions.

Many subcircuits useful for analog circuit design can be recognized simply by parsing a netlist as described above. For example a subcircuit can be recognized as a CMOS inverter if the corresponding netlist has the following features: (i) two complementary MOSFETs; (ii) with common gate net connection; (iii) with common drain net connection; (iv) with each source connected to a different power supply net; (v) no shorted gate and drain; (vi) no shorted gate and source; and (vii) no shorted drain and source. Once recognized as a CMOS inverter, subcircuit physical circuit layout can be obtained from a pre-existing library, but without further layout customization that may be necessary or desirable. However, as discussed above, the present invention can be implemented to enable a designer to designate further layout constraints by providing schematic layout "cues" related to the position and orientation of graphic elements representing components, rather than an awkward and inefficient manual process of text entry or any combination of selections in a schematic and selections from nested menus.

Analog subcircuits that can be identified or conditionally identified from netlist examination and schematic format cues include, without limitation, examples as shown Table 1.

TABLE 1 power, bias, and ground distribution networks
symbols, nets and pins symmetrical pairs determined from differential pairs and/or mirrored transistors
self-symmetries
cross-symmetries
differential pairs made of FETs or BJTs
cross-coupled differential quads
components in parallel connection
current mirrors made of FETs or BJTs TABLE 1-continued cascoded current mirrors of FETs or BJTs
active loads
cascoded pairs of FETs or BJTs
buffers
inverters
power-down switches
transmission gates
dummy FETs/BJTs
MOSFETs connected as capacitors
size categorized FETs Table 2 lists, without limitation, exemplary physical circuit layout constraint recommendations for subcircuits, components within subcircuits, and interconnection:

TABLE 2 overall cell dimensions and aspect ratio
device positions, dimensions, and orientations for power, bias, and ground interconnect ("rails")
component pin positions and orientations
symmetrical positions of component pairs, including same or mirrored orientations
same physical implementations of several components to create matching with or without same orientation, same proximity, or cross-coupling positions
symmetries external to components, e.g. for matching
free form groups of components, with and without guard rings and/or shared isolation wells
grid form arrays of components, including customized spacing versus device type serial/parallel networking
component generators, including interdigitation and body contact insertion
device-level and function-dependant routing styles
symmetrical interconnect paths of net pairs
shielded wires for sensitive signal nets
differential routing of differential signals
general interconnection type and routing preferences
routing priorities based on interconnect type Various embodiments of the invention and implementation examples have been described above. However, it is understood that these various embodiments and examples are for illustrative purposes only and should not serve to limit the scope of the invention. It is also readily understood by those of ordinary skill in the art how to design and implement the disclosed embodiments using alternative architectures, processes, functionality, structures, and implementations. In sum, after reading this description, various modifications of, and alternatives to, the embodiments described above can be implemented by those of ordinary skill in the art, without undue experimentation. These various modifications and alternatives are contemplated to be within the spirit and scope of the invention. As an example of such modifications and alternatives, particulars of the GUI described herein may be altered but accomplish the desired aspects of the invention. As a further example, the operating steps and sequences of operating steps for subcircuit-type determination and physical circuit layout constraint generation can be modified while still accomplishing the desired aspects of the invention. The specific CAD tools mentioned herein are used for illustrative purposes only and may be replaced by others of similar functionality while accomplishing the desired aspects of the invention.

What is claimed is:

1. A method for generating a physical circuit layout constraint, comprising:

correlating an instance of occurrence of a subcircuit in a netlist corresponding to a schematic diagram with a subcircuit-type netlist, wherein the subcircuit-type netlist has an associated physical circuit layout constraint;

correlating an instance of a component's occurrence in the subcircuit corresponding to a component type in the correlated subcircuit-type netlist;

determining a physical circuit layout constraint for the instance of the component's occurrence in the subcircuit;

displaying the associated physical circuit layout constraint; and displaying an acceptance or rejection indicator for accepting or rejecting the associated physical layout constraint, wherein the associated physical circuit layout constraint is grouped with another physical circuit layout constraint for acceptance or rejection as a group.

2. The method of claim 1, wherein the subcircuit-type netlist comprises one of a plurality of subcircuit-type netlists in a sub circuit-type library.

3. The method of claim 1, further comprising displaying a drawing of a circuit schematic containing a schematic feature to which the associated physical circuit layout constraint applies, and highlighting the schematic feature to which the associated physical circuit layout constraint applies.

4. The method of claim 1, further comprising displaying a physical circuit layout depiction having a layout feature to which the associated physical circuit layout constraint applies, and highlighting the layout feature to which the associated physical circuit layout constraint applies.

5. The method of claim 1, wherein computer executable instructions stored on a computer-readable medium, when executed by a processor, cause the processor to perform the recited method.

6. A method for determining a subcircuit type from an examination of a circuit schematic drawing, comprising:

deriving a netlist from the circuit schematic drawing;

extracting x and y coordinates of a symbol representing a feature in the circuit schematic drawing;

determining that the extracted x and y coordinates meet a criterion;

designing nodes of the feature in the circuit schematic drawing that meet the criterion to comprise a netlist of the designated nodes; and correlating the netlist of the designated nodes with a netlist corresponding to the subcircuit type.

7. The method of claim 6, wherein determining further comprises determining whether a sum of square of a difference between the x and y coordinates and square of a difference between another set of x and y coordinates, respectively, is within a tolerance.

8. The method of claim 6, wherein the determining further comprises determining whether the x and y coordinates are each within respective, x and y coordinate tolerances of another set of x and y coordinates.

9. The method of claim 6 further comprising a determination of a left or right orientation of the symbol.

10. The method of claim 9 further comprising a determination of whether the left or right orientation of the symbol, relative to the left or right orientation of another symbol in the schematic drawing, corresponds to a relative left or right orientation of a respective feature in a subcircuit type.

11. The method of claim 6, wherein computer executable instructions stored on a computer-readable medium, when executed by a processor, cause the processor to perform the recited method.

12. A method for determining a physical circuit layout constraint from a circuit schematic drawing having symbolic representations, comprising:

parsing a netlist corresponding to the circuit schematic drawing for occurrences of at least two parallel-connected transistors with corresponding terminals connected in parallel;

designating the symbolic representations of parallel-connected transistor symbols as having a physical circuit layout constraint; and substituting unique, single-transistor representations for each parallel-connection of transistor symbols in the netlist.

13. The method of claim 12, further comprising parsing the netlist for occurrences of the single transistor representations, along with the remaining transistor representations in the netlist, for pairs having at least one connected pair of corresponding pins, to determine common-node transistor-transistor pairs.

14. The method of claim 13, further comprising:

determining whether each of the symbolic representations of transistors in a common-node transistor-transistor pair is positioned within a vertical positional tolerance of one another in the circuit schematic drawing; and if so, designating the common-node transistor-transistor pair as a differential pair having a physical circuit layout constraint.

15. The method of claim 14, further comprising:

calculating horizontal coordinate of a vertical axis midway between schematic symbols designated as a differential pair;

searching for two schematic symbols in the circuit schematic drawing that are connected to different, corresponding nodes of two different transistors of the differential pair;

determining that the schematic symbols are equidistant from the vertical axis, within a horizontal positional tolerance; and designating the schematic symbols as having a circuit layout constraint.

16. The method of claim 12, wherein computer executable instructions stored on a computer-readable medium, when executed by a processor, cause the processor to perform the recited method.

17. A system for generating a physical circuit layout constraint, comprising:

means for correlating an instance of occurrence of a subcircuit in a netlist corresponding to a schematic diagram, with a subcircuit-type netlist, wherein the subcircuit-type netlist is one of a plurality of subcircuit-type netlists in a subcircuit-type library;

means for correlating an instance of a component's occurrence in the subcircuit corresponding to a component type in the correlated subcircuit-type netlist;

means for determining at least one of a physical circuit layout constraint and a component parameter relationship for the instance of the component's occurrence in the subcircuit, wherein the component parameter relationship specifies a parameter relationship between different components in the subcircuit; and a display means for displaying a physical circuit layout constraint having an associated subcircuit-type netlist, including means for displaying an acceptance or rejection indicator on a display for accepting or rejecting the physical layout constraint.

18. The system of claim 17, wherein the physical circuit layout constraint is grouped with another physical circuit layout constraint for acceptance or rejection as a group.

19. The system of claim 17, wherein the display means displays a drawing of a circuit schematic containing a schematic feature to which the physical circuit constraint applies, and further comprising means to highlight the schematic feature on the display to which the physical circuit layout constraint applies.

20. The system of claim 17, wherein the display means displays a physical circuit layout depiction having a layout feature to which the physical circuit layout constraint applies, and further comprising means to highlight the layout feature on the display to which the physical circuit layout constraint applies.

21. A method for generating a physical circuit layout constraint, comprising:

correlating an instance of occurrence of a subcircuit in a netlist corresponding to a schematic diagram, with a subcircuit-type netlist;

correlating an instance of a component's occurrence in the subcircuit corresponding to a component type in the correlated subcircuit-type netlist;

determining a component parameter relationship for the instance of the component's occurrence in the subcircuit, that specifies a parameter relationship between different components in the subcircuit; and displaying a physical circuit layout constraint having an associated subcircuit-type netlist including displaying an acceptance or rejection indicator on a display for accepting or rejecting the physical layout constraint.

* * * * *